United States Patent
Lee

(10) Patent No.: US 8,246,099 B2
(45) Date of Patent: Aug. 21, 2012

(54) SUN VISOR FOR VEHICLE AND METHOD OF OPERATING THE SAME

(75) Inventor: Seung Woo Lee, Seoul (KR)

(73) Assignee: Hyundai Motor Company, Seoul (KR)

( * ) Notice: Subject to any disclaimer, the term of this patent is extended or adjusted under 35 U.S.C. 154(b) by 670 days.

(21) Appl. No.: 12/331,476

(22) Filed: Dec. 10, 2008

(65) Prior Publication Data

US 2009/0152891 A1   Jun. 18, 2009

(30) Foreign Application Priority Data

Dec. 14, 2007   (KR) .................. 10-2007-0131003

(51) Int. Cl.
*B60J 3/02* (2006.01)
(52) U.S. Cl. ...................................... 296/97.4; 296/97.8
(58) Field of Classification Search ................. 296/97.4, 296/97.2, 97.6, 97.8, 97.1
See application file for complete search history.

(56) References Cited

U.S. PATENT DOCUMENTS 5,490,708 A * 2/1996 Lee .............................. 296/97.8
6,237,984 B1 * 5/2001 Cross ........................... 296/97.4

FOREIGN PATENT DOCUMENTS

KR   10-1997-0051310   7/1997
KR   10-1998-0060254   10/1998

\* cited by examiner

*Primary Examiner* — Glenn Dayoan
*Assistant Examiner* — Melissa A Black
(74) *Attorney, Agent, or Firm* — Edwards Wildman Palmer LLP; Peter F. Corless

(57) ABSTRACT

A sun visor for a vehicle and method of operating the same which prevents glare caused by light from the sun or headlights and which promotes safe driving without obstructing the field of view of a driver. The invention also features methods for operating the sun visor.

4 Claims, 10 Drawing Sheets

[FIG. 7]
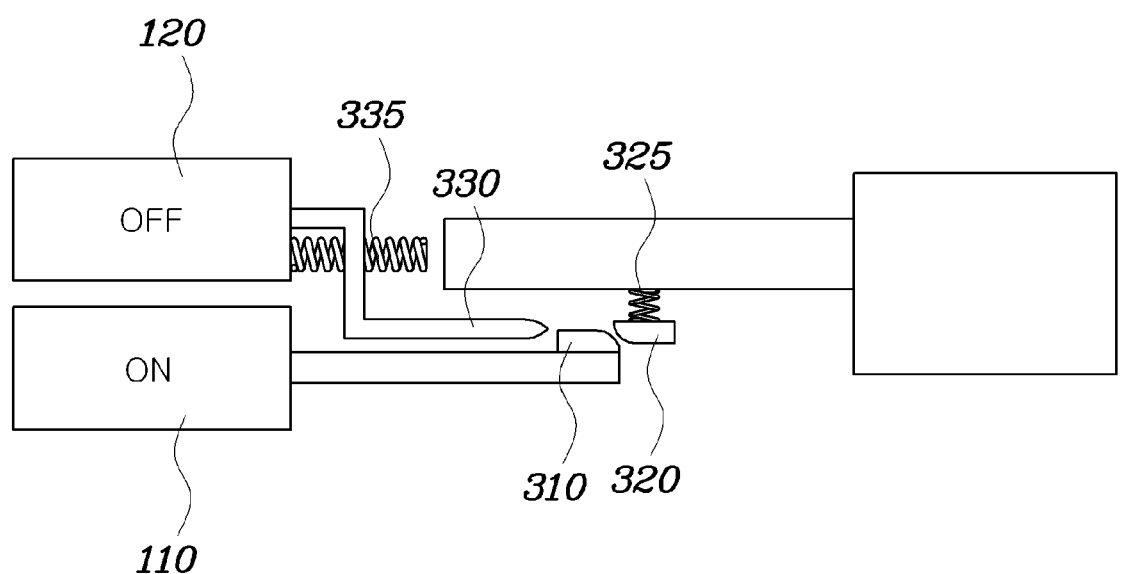

[FIG. 8]
(a)
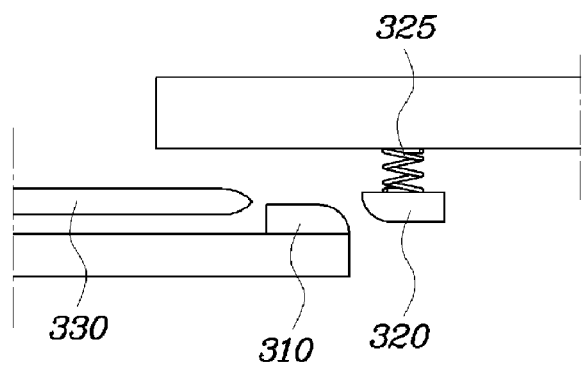
(b)
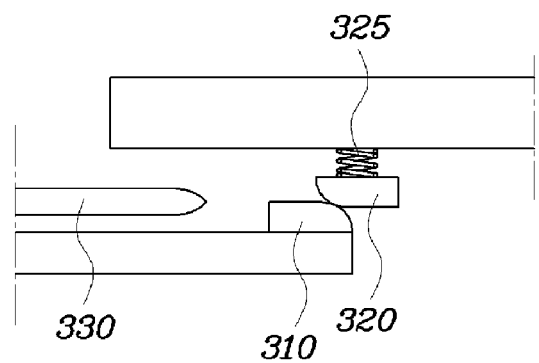
(c)
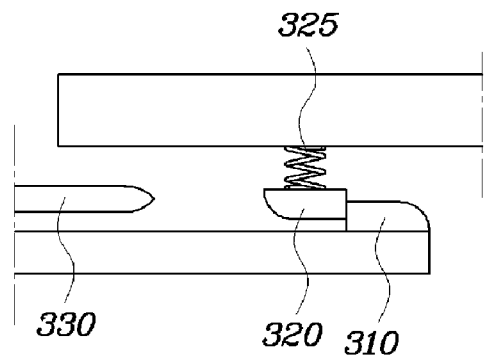

[FIG. 9]
(a)
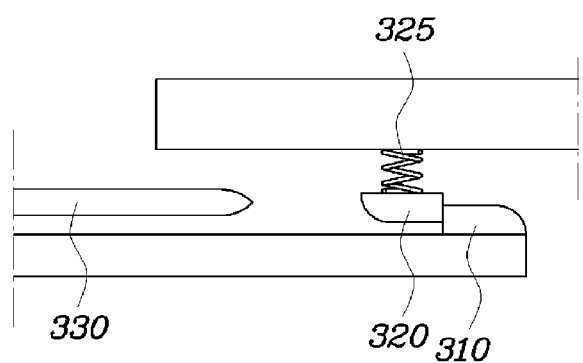
(b)
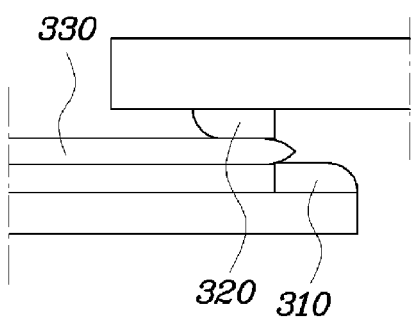
(c)
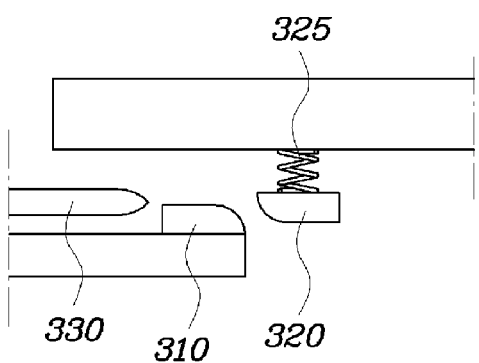

[FIG. 10]
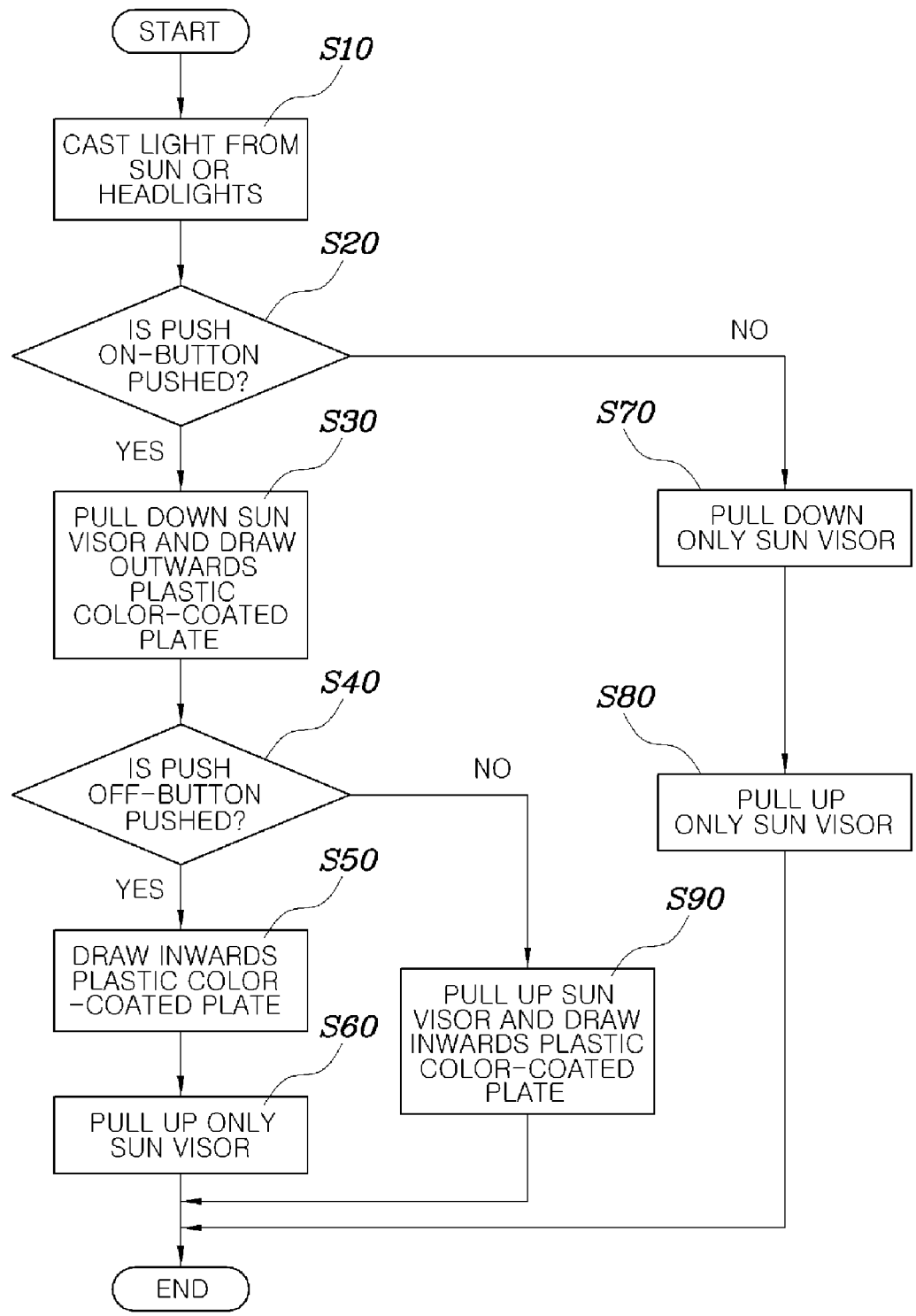

SUN VISOR FOR VEHICLE AND METHOD OF OPERATING THE SAME

CROSS-REFERENCE TO RELATED APPLICATIONS

This application claims under 35 U.S.C. §119(a) priority to Korean Application No. 10-2007-0131003, filed on Dec. 14, 2007, the disclosure of which is incorporated herein by reference in its entirety.

BACKGROUND OF THE INVENTION

1. Field of the Invention

The present invention relates, in general, to a sun visor for a vehicle and method of operating the same and, more particularly, to a sun visor for a vehicle and method of operating the same which blocks glare caused by light from the sun or headlights of other vehicles, helping to promote safe driving.

2. Background Art

In general, sun visors for vehicles are devices that are made up of a flat plate covered with a rubber material, are mounted on a front roof panel inside the vehicle, and block light from the sun or headlights to give a more comfortable ride to a driver and/or a passenger.

As illustrated in FIG. 1, a conventional sun visor for a vehicle serves as a shade for sunlight and an air conditioner in addition to providing various holders. A variety of sun visors, such as one that mounts a mirror in the front thereof, or such that one can look in the mirror, are manufactured.

However, such a sun visor may be insufficient to shade the eyes from strong sunlight or light from the headlights of other vehicles when this light is directly cast into the eyes of a driver during driving.

A reason for this is that the eyes of the driver must be shaded from the light in order to shade the light that is directly cast into the driver's eyes. In certain examples drivers pull down and slant the sun visor in order to use it. Accordingly, the sun visor partly blocks a field of view of the driver, yet fails to completely block the sunlight or the light from the headlights. As a result, the sun visor may cause an inconvenience to the driver.

Accordingly, there is a need in the art for a new sun visor that can replace the conventional sun visor, and for example solve the inconvenience to the driver that may be caused by the conventional sun visor, said new sun visor that can completely or substantially completely block the sunlight, etc. from being directly cast into the eyes of the driver without obstructing the view while driving.

The above information disclosed in this the Background section is only for enhancement of understanding of the background of the invention and therefore it may contain information that does not form the prior art that is already known in this country to a person of ordinary skill in the art.

SUMMARY OF THE INVENTION

IN one aspect, the present invention provides a sun visor for a vehicle and method of operating the same, which completely or substantially completely prevents glare caused by light from the sun or headlights of other vehicles to help promote safe driving without shading the field of view of a driver.

According to one exemplary embodiment of the present invention, the sun visor for a vehicle may preferably include a push button unit suitably installed on the upper portion of a body of the sun visor and controlling the ON/OFF state of electric current; an electromagnetic field generator generating repulsive force when the current is applied and attractive force due to elastic springs when the current is not applied according to whether the push button unit is switched on or off; and a plastic color-coated plate drawn into or out of the body of the sun visor according to the operation of the electromagnetic field generator so as to block the light from the sun or the headlights.

According to another exemplary embodiment of the present invention, the sun visor for a vehicle may preferably include a push button unit having on button and off button, a gear unit having gears suitably engaged with each other according to pushing of the push button unit and suitably rotated along with a rotating shaft of the sun visor, a locking unit suitably regulating rotation of the gear unit according to the pushing of the push button unit, a plastic color-coated plate drawn into or out of a body of the sun visor according to the rotation of the gear unit so as to block the light from the sun or the headlights, and a restoring spring drawing the plastic color-coated plate into the body of the sun visor when the engagement of the gears of the gear unit is released by the operation of the push button unit and the locking unit.

According to another exemplary embodiment of the present invention, the method of operating the sun visor may preferably include the steps of: casting light from the sun or headlights into a driver seat in the interior of a vehicle; determining, by a driver, whether or not the glare is caused by the light coming from the sun or the headlights, and pushing a push button unit; pulling down the sun visor when the push button unit is pushed, and drawing the plastic color-coated plate out of the body of the sun visor so as to block the light from the sun or the headlights; pushing, by the driver, the push button unit again when the glare caused by the light from the sun or the headlights disappears; and drawing the plastic color-coated plate into the body of the sun visor when the push button unit is pushed.

According to further preferred embodiments of the present invention, the sun visor for a vehicle and method of operating the same can sufficiently prevent glare caused by light from the sun or headlights without suitably obstructing the field of view of a driver, so that a driver's safe driving is promoted.

Further, in other preferred embodiments, the sun visor for a vehicle and method of operating the same can prevent direct light such as sunlight from directly reaching a passenger, thereby contributing to a substantially more comfortable ride for the passenger.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other objects, features and advantages of the present invention will be more clearly understood from the following detailed description when taken in conjunction with the accompanying drawings, in which:

FIG. 7 is a front view illustrating the construction of the locking unit of a second embodiment of the present invention;

FIG. 8 and FIG. 9 are drawings illustrating the operation of the locking unit of a second embodiment of the present invention; and FIG. 10 is a flow chart illustrating a method of operating a sun visor for a vehicle according to a second embodiment of the present invention.

DETAILED DESCRIPTION OF THE INVENTION

Figure 1:
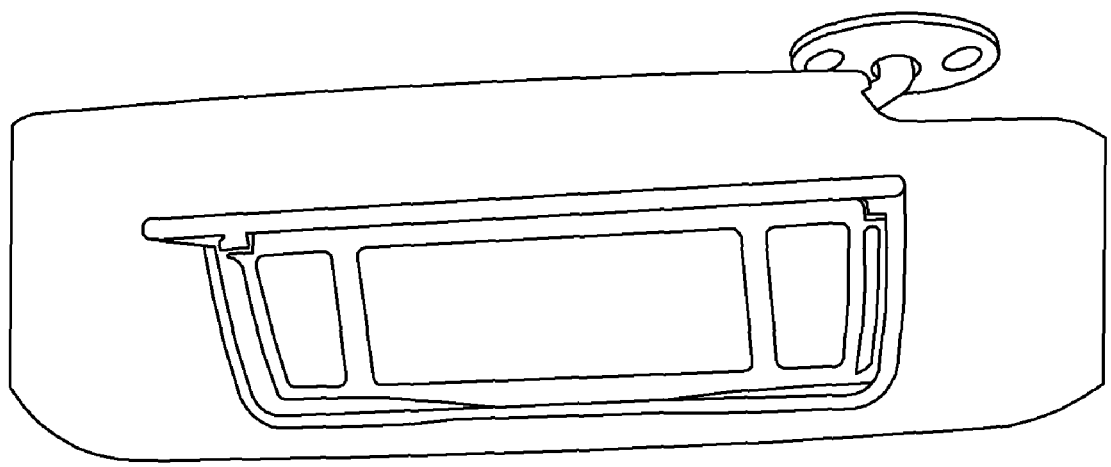
FIG. 1 is a perspective view illustrating a conventional sun visor for a vehicle.

As described herein, the present invention includes a sun visor for a vehicle which prevents glare caused by light from the sun or headlights, the sun visor comprising a push button unit controlling an ON/OFF state of electric current, an electromagnetic field generator generating repulsive force when the current is applied and attractive force due to elastic springs when the current is not applied according to whether the push button unit is switch on or off; and a plastic color-coated plate.

In one embodiment, the push button unit is installed on an upper portion of a body of the sun visor.

In another embodiments, the plastic color-coated plate is drawn into or out of the body of the sun visor according to the operation of the electromagnetic field generator so as to block the light from the sun or the headlights.

The invention also features a sun visor for a vehicle which prevents glare caused by light from the sun or headlights, the sun visor comprising a push button unit having on button and off button; a gear unit; a locking unit regulating rotation of the gear unit according to the pushing of the push button unit; a plastic color-coated plate; and a restoring spring.

In one embodiment, the gear unit has gears engaged with each other according to pushing of the push button unit and rotated along with a rotating shaft of the sun visor.

In another embodiment, the locking unit regulates the rotation of the gear unit according to the pushing of the push button unit.

In still another embodiment, the plastic color-coated plate is drawn into or out of a body of the sun visor according to the rotation of the gear unit so as to block the light from the sun or the headlights.

In another related embodiment, the restoring spring draws the plastic color-coated plate into the body of the sun visor when the engagement of the gears of the gear unit is released by the operation of the push button unit and the locking unit.

The invention also features a method of operating a sun visor for a vehicle for preventing glare caused by light from the sun or headlights, the method preferably comprising the steps of casting the light from the sun or the headlights into a driver's seat in an interior of the vehicle; determining, by a driver, whether or not the glare is caused by the light from the sun or the headlights, and pushing a push button unit; pulling down the sun visor when the push button unit is pushed, and drawing the plastic color-coated plate out of the body of the sun visor so as to block the light from the sun or the headlights; pushing, by the driver, the push button unit again when the glare caused by the cast light from the sun or the headlights disappears; and drawing the plastic color-coated plate into the body of the sun visor when the push button unit is pushed.

The invention also features a motor vehicle comprising a sun visor of any one of the embodiments as described herein. Reference will now be made in greater detail to exemplary embodiments of the invention, examples of which are illustrated in the accompanying drawings. Wherever possible, the same reference numerals will be used throughout the drawings and the description to refer to the same or like parts.

Figure 2:
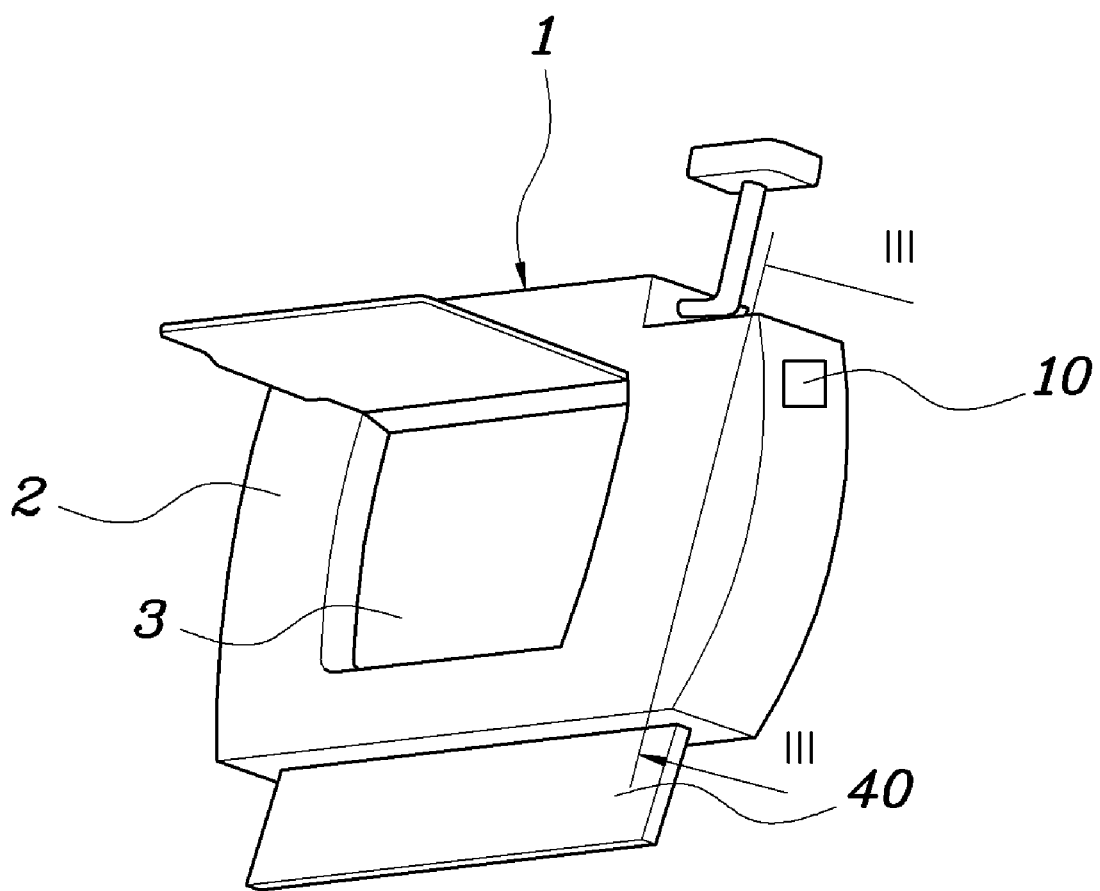
FIG. 2 is a perspective view illustrating a sun visor for a vehicle according to a first embodiment of the present invention.
Figure 3:
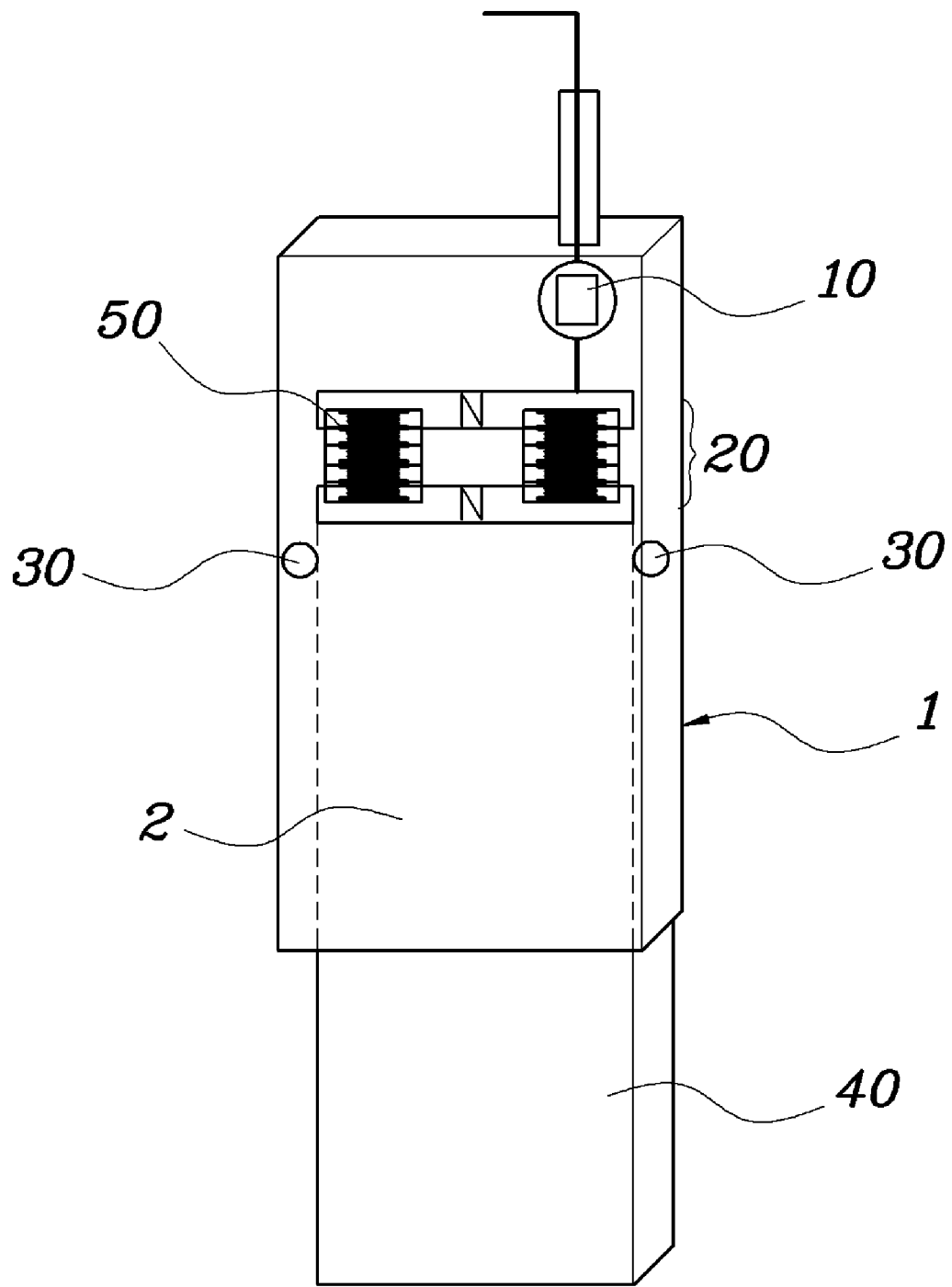
FIG. 3 is a cross-sectional view taken along the line III-III of FIG. 2.
Figure 4:
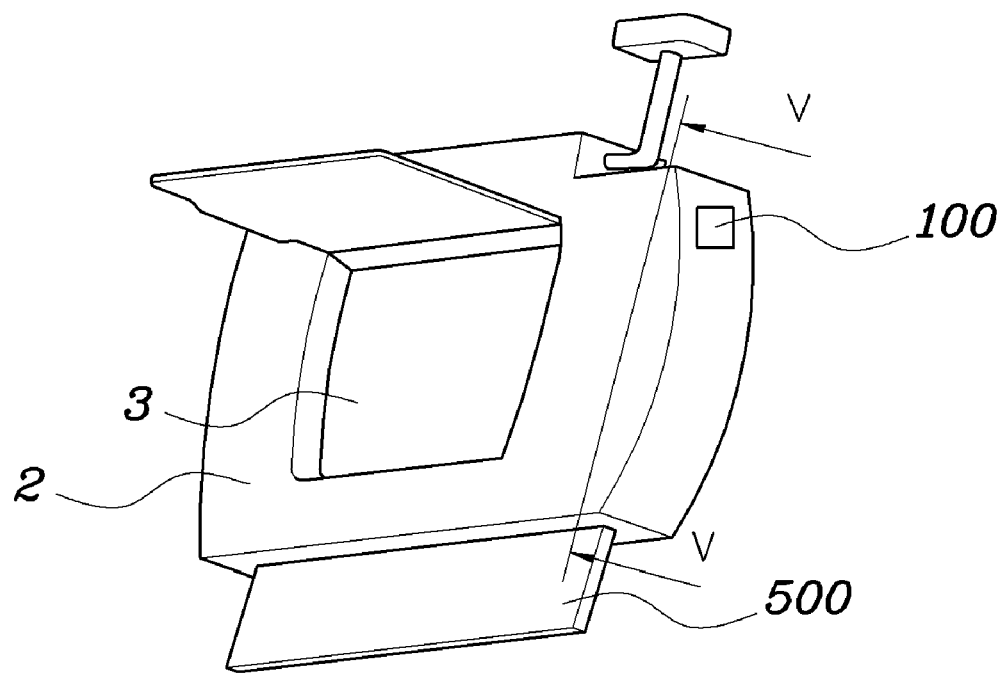
FIG. 4 is a perspective view illustrating a sun visor for a vehicle according to a second embodiment of the present invention.
Figure 5:
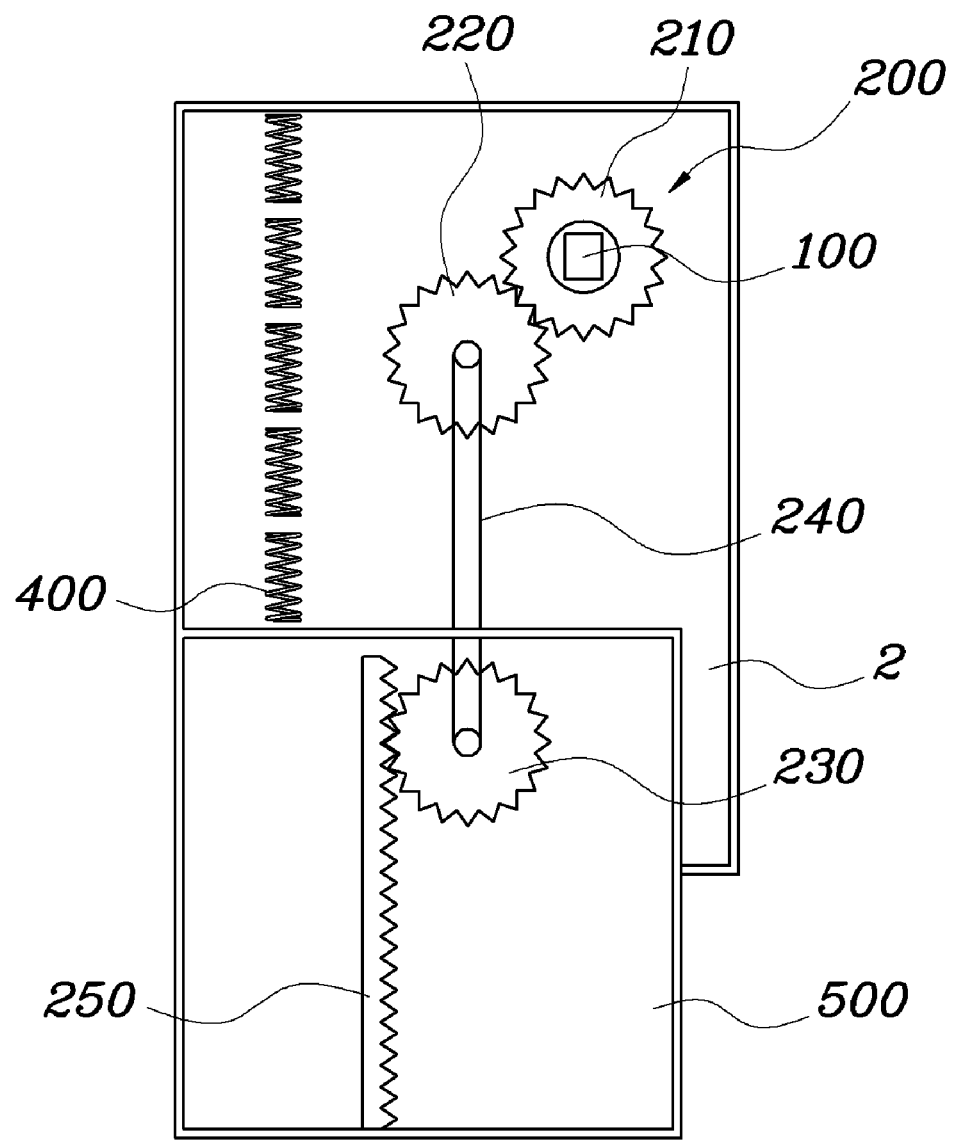
FIG. 5 is a cross-sectional view taken along the line V-V of FIG. 4.
Figure 6:
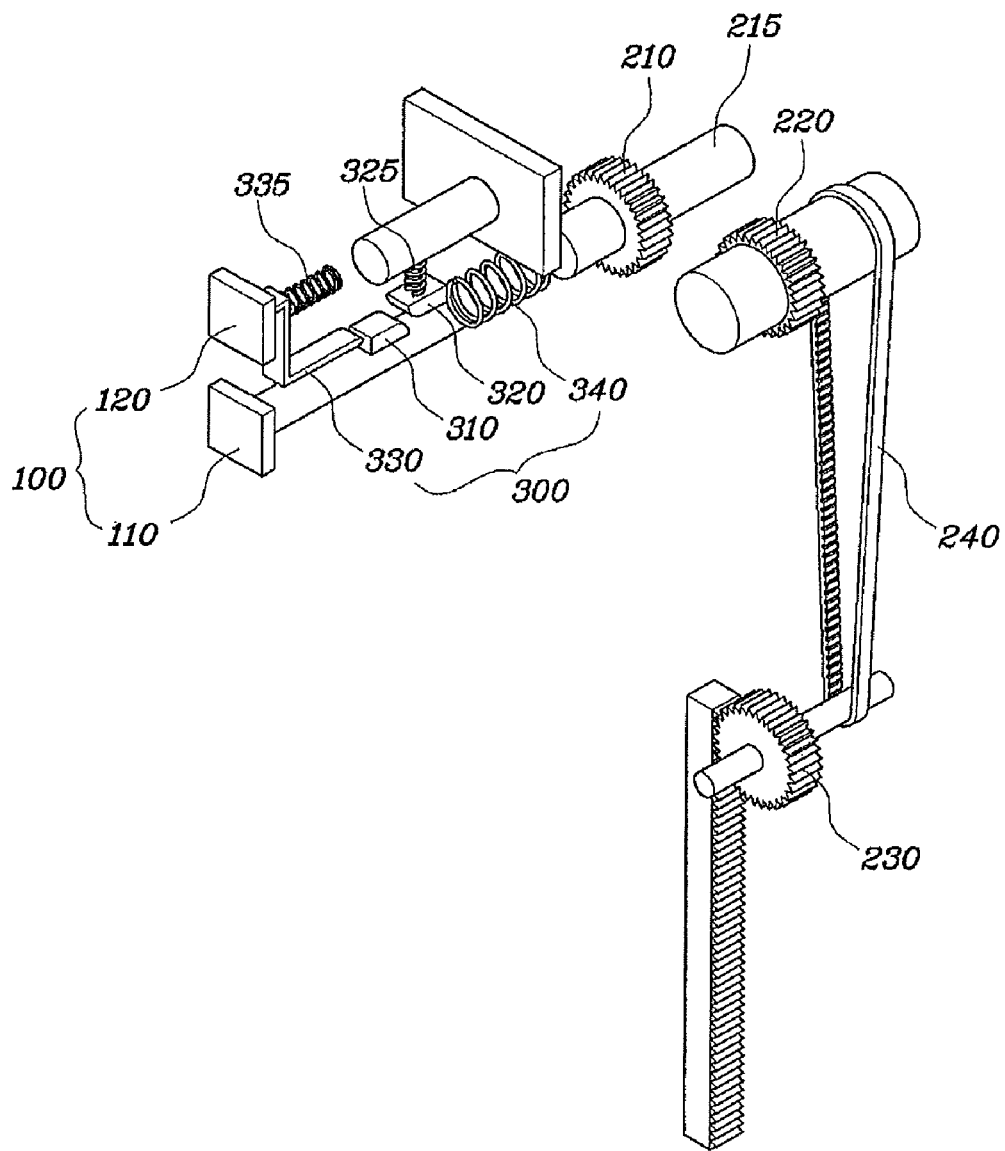
FIG. 6 is an exploded perspective view illustrating the operation of the sun visor for a vehicle according to a second embodiment of the present invention.

FIG. 2 is a perspective view illustrating an exemplary sun visor for a vehicle according to a first embodiment of the present invention. FIG. 3 is a cross-sectional view taken along the line III-III of FIG. 2. FIG. 4 is a perspective view illustrating an exemplary sun visor for a vehicle according to a second embodiment of the present invention. FIG. 5 is a cross-sectional view taken along the line V-V of FIG. 4. FIG. 6 is an exploded perspective view illustrating preferred operation of a sun visor for a vehicle according to a second embodiment of the present invention. FIGS. 7 through 9 are drawings illustrating the preferred operation of the locking unit of a second embodiment. FIG. 10 is a flow chart illustrating a preferred method of operating a sun visor for a vehicle according to a second embodiment of the present invention.

As illustrated in FIGS. 2 and 4, according to certain preferred embodiments of the present invention, the sun visor 1 for a vehicle preferably includes a mirror 3 at a central part thereof which is generally used, a plastic color-coated plate 40 or 500 suitably mounted on a body 2 in a retractable fashion and blocking light from the sun or headlights, and a push button unit 10 or 100 suitably manipulated by a driver for drawing the plastic color-coated plate 40 or 500 into or out of the body 2.

As illustrated in FIGS. 2 and 3, in the first embodiment of the present invention, the sun visor for a vehicle suitably prevents glare caused by the light from the sun or the headlights of other vehicles, and preferably includes the push button unit 10, an electromagnetic field generator 20, a roller 30, and the plastic color-coated plate 40.

In exemplary embodiments, the push button unit 10 is preferably installed on an upper portion of the body 2 of the sun visor 1, and suitably functions to apply or interrupt electric current according to whether it is switched on or off. The push button unit 10 is preferably installed at a position where a driver or a passenger can easily manipulate the push button unit 10 so as to be able to rapidly block incident light.

In exemplary embodiments, the electromagnetic field generator 20 generates repulsive force when the current is applied by the ON state of the push button unit 10, and attractive force due to elastic springs 50, which will be described below, when the current is not applied by the OFF state of the push button unit 10.

In further preferred embodiments, the electromagnetic field generator 20 is made up of an N polarity object attached to the body 2 and an N polarity object attached to the plastic color-coated plate 40, adapted to repel each other, particularly in lowering of the plastic color-coated plate 40 when the current is suitably applied.

According to related embodiments, the roller 30 guides the plastic color-coated plate 40 drawn into or out of the body 2 of the sun visor 1 according to the operation of the electromagnetic field generator 20. In further preferred embodiments, when the current is suitably applied to generate the repulsive force, the plastic color-coated plate 40 moves downwards while the roller 30 rotates. In contrast, when the attractive force is generated by the elastic springs 50, the plastic color-coated plate 40 moves upwards while the roller 30 rotates reversely.

Preferably, the plastic color-coated plate 40 blocks the light from the sun or the headlights while moving downwards according to the operation of the electromagnetic field generator 20. Preferably, the plastic color-coated plate 40 is suitably coated with a transparent color dye or film like that of sunglasses which people wear, and thus functions to shade the light without obstructing a field of view of the driver.

The operation of the sun visor for a vehicle having the abovementioned configuration according to a first preferred embodiment of the present invention will be described herein.

IN certain exemplary embodiments, for example in the case in which glare occurs due to strong sunlight during daytime driving or due to strong light coming from the headlights of other vehicles during night driving, the driver preferably pushes the push button unit 10 to turn on a circuit of the sun visor 1, and thus the current of the vehicle is applied to the sun visor 1.

Preferably, when the current is applied to the sun visor 1, an electromagnetic field is suitably established in a space of the electromagnetic field generator 20, and then causes the N polarity object attached to the plastic color-coated plate 40 and the N polarity object attached to the body 2 to suitably repel each other. According to related embodiments, the plastic color-coated plate 40 is suitably drawn out of the body 2 while the roller 30 rotates.

Accordingly, the plastic color-coated plate 40 is functionally similar to sunglasses, and thus can substantially or considerably cover the glare caused by the strong light from the sun or the headlights.

According to certain embodiments, when the plastic color-coated plate 40 is no longer required because the light cast into the interior of the vehicle is not strong, the driver preferably pushes the push button unit 10 to turn off the circuit of the sun visor 1, and thus the current of the vehicle is no longer suitably applied to the sun visor 1.

At this time, according to further preferred embodiments, the plastic color-coated plate 40 is suitably drawn into the body 2 due to an elastic force of the elastic springs 50 installed in the body 2. Thus, the undesired obstruction of the field of view of the driver caused by the plastic color-coated plate 40 can be suitably avoided. Even in this case, the body 2 of the sun visor 1 is manipulated to continue to cover weak light.

As illustrated in FIGS. 4 through 6, in the second embodiment of the present invention, the sun visor for a vehicle suitably prevents glare caused by the light from the sun or the headlights of other vehicles, and preferably includes a push button unit 100, a gear unit 200, a locking unit 300, a restoring spring 400, and a plastic color-coated plate 500.

According to exemplary embodiments of the invention, the push button unit 100 having on button 110 and off button 120, is suitably installed on an upper portion of the body 2 of the sun visor 1, and functions to sequentially operate the gear unit 200, locking unit 300, restoring spring 400, and plastic color-coated plate 500, which will be described below, according to pushing operation. Preferably, the push button unit 100 is preferably installed at a position where a driver or a passenger can easily manipulate the push button unit 100 and rapidly block the incident light as in the first embodiment.

According to other exemplary embodiments, the gear unit 200 is made up of a plurality of gears, which are engaged with each other by pushing the push button unit 100, is rotated along with a rotating shaft 215 of the sun visor 1, and suitably moves the plastic color-coated plate 500 in an upward or downward direction.

Accordingly, and as illustrated in exemplary FIG. 6, the gear unit 200 preferably includes a first gear 210 that is rotatably mounted on the rotating shaft 215 of the sun visor 1 and is suitably shifted by pushing the push button unit 100; a second gear 220 that is rotatably engaged with the first gear 210 when the first gear 210 is shifted; and a third gear 230 that is suitably connected with the second gear 220 through a driving belt 240, is engaged with a rack gear 250, which is attached to the plastic color-coated plate 500 and converts rotary motion into linear motion of the gear unit 200, and linearly moves the plastic color-coated plate 500 when the second gear 220 is suitably rotated.

Preferably, according to certain embodiments, the first, second and third gears 210, 220 and 230 must be suitably small enough to be mounted in the body 2 of the sun visor 1. Further, since the rotating shaft 215 of the sun visor 1 rotates at an angle of about 90° when the driver typically pulls down the sun visor, the first, second and third gears 210, 220 and 230 must have a gear ratio of enough to draw the plastic color-coated plate 500 out of the body 2 of the sun visor 1 even at this rotating angle.

Preferably, the locking unit 300 regulates the rotation of the gear unit 200 caused by the operation of pushing the push button unit 100.

Accordingly, and as illustrated in exemplary FIG. 6 and FIG. 7, the locking unit 300 preferably includes a first locking key 310 moving along with the first gear 210 when the on button 110 of push button unit 100 is pushed, a second locking key 320 suitably fastened with the first locking key 310 when the first locking key 310 moves, an unlocking key 330 releasing the fastened state of the first and second locking keys 310 and 320 when the off button 120 of push button unit 100 is pushed, and an elastic spring 340 returning the first locking key 310 to its original position when the fastened state of the first and second locking keys 310 and 320 is released. The detailed operation of the locking unit 300 having this configuration is described herein.

According to preferred embodiments of the invention, the restoring spring 400 suitably draws the plastic color-coated plate 500 into the body 2 of the sun visor 1 when the engagement of the gears of the gear unit 200 is released by the operation of the push button unit 100 and the locking unit 300.

Accordingly, and as described in the first embodiment, the plastic color-coated plate 500 blocks light from the sun or the headlights while being suitably drawn out of the body 2 of the sun visor 1 by the rotation of the gear unit 200.

In further preferred embodiments, the sun visor 1 is additionally provided with a bearing, which suitably prevents the push button unit 100 from interfering with rotation of the rotating shaft 215. This bearing functions to shift the rotating shaft 215 along with the first gear 210 without obstructing the rotation of the rotating shaft 215 when the push button unit 100 is pushed.

The operation of the sun visor for a vehicle having the abovementioned configuration according to a second embodiment of the present invention will be described below with reference to FIG. 8 and FIG. 9.

In one exemplary embodiment, when the driver pushes the on button 110 of push button unit 100 in order to prevent the glare caused by strong light cast from the sun or the headlights of other vehicles into the interior of the vehicle, the first gear 210 is shifted and engaged with the second gear 220.

In preferred examples, as illustrated in exemplary FIG. 8, the first and second locking keys 310 and 320 lock onto each other, thereby keeping the first and second gears 210 and 220 engaged with each other so as to be suitably rotated at the same time.

Preferably, when the driver pulls down the sun visor 1, the first and second gears 210 and 220 are rotated along with the rotating shaft 215, and then the third gear 230 connected with the first and second gears 210 and 220 via the driving belt 240 is rotated.

As a result, in further embodiments, the rack gear 250 engaged with the third gear 230 moves linearly to suitably draw the plastic color-coated plate 500 out of the body 2 of the sun visor 1, so that the light from the sun or the headlights is suitably blocked.

In certain embodiments, when wanting to draw the plastic color-coated plate 500 into the body 2 of the sun visor 1 in the state in which the sun visor 1 is pulled down, the driver pushes the off button 120 of push button unit 100.

In further embodiments, for example, as illustrated in FIG. 9, the unlocking key 330 enters under the first locking key 310, thus releasing the fastened state of the first and second locking keys 310 and 320, thereby suitably returning the second locking key 320 to its original position by the elastic spring 340. The off button 120 also is returned to its original position by an elastic spring 335.

As a result, in related embodiments the engagement of the first and second gears 210 and 220 is released, and the plastic color-coated plate 500 that has moved outwards is suitably drawn into the body 2 of the sun visor 1 by the restoring spring 400. Thus, according to exemplary embodiments of the invention as described herein, the driver can preferably drive the vehicle in the state in which only the body 2 of the sun visor 1 is pulled down in order to shade weak light.

In other embodiments, for example, in the case in which the driver preferably pulls up the sun visor 1 to its original position without pushing the off button 120 of push button unit 100 because the sun visor 1 is not required, the first and second gears 210 and 220 are reversely rotated, thus drawing the plastic color-coated plate 500 into the body 2 of the sun visor 1.

In other particular embodiments, for example, when glare occurs due to strong light from the sun or the headlights of other vehicles, a method of operating the sun visor of a vehicle for preventing such glare will be described below with reference to FIG. 9.

In certain cases, during travelling, the light from the sun or the headlights is cast into a driver seat in an interior of the vehicle (S10).

At this time, the driver determines whether or not glare is caused by the cast light from the sun or the headlights, and then if so, the driver preferably pushes the on button 110 of push button unit 100 (S20).

In other embodiments, the sun visor 1 is pulled down when the driver pushes the on button 110 of push button unit 100, and thus the plastic color-coated plate 500 is suitably drawn out of the body 2 of the sun visor 1, and thereby blocks the light from the sun or the headlights (S30).

According to further embodiments of the invention as described herein, if the driver determines that the light from the sun or the headlights can be sufficiently blocked only by the body 2 of the sun visor 1, the driver can manually flip down or up only the sun visor 1 without pushing the push button unit 100 (S70 and S80).

In step S30, when the glare caused by the light from the sun or the headlights is removed after the plastic color-coated plate 500 is drawn out, the driver suitably determines whether to draw only the plastic color-coated plate 500 into the body 2 of the sun visor 1 or to pull up the sun visor 1 itself (S40).

As a result of the determination, when intending to draw only the plastic color-coated plate 500 into the body 2 of the sun visor 1, the driver preferably pushes the off button 120 of push button unit 100 once more again, and thereby only the plastic color-coated plate 500 is drawn into the body 2 of the sun visor 1 (S50). Afterwards, in the case in which it is no longer necessary to use even the sun visor 1, the sun visor 1 can be manually flipped up (S60).

In other embodiments of the invention, for example when intending to pull up the sun visor 1 itself, the driver may flip up the sun visor 1 without pushing the push button unit 100. Simultaneously, the plastic color-coated plate 500 that has drawn out is also drawn into the body of the sun visor 1 (S90).

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A sun visor for a vehicle which prevents glare caused by light from the sun or headlights, the sun visor comprising:
   a push button unit having an on button and an off button;
   a gear unit having a plurality of gears engaged with each other according to pushing of the push button unit,
   wherein the gear unit includes:
      a first gear rotatably mounted on the rotating shaft of the sun visor and shifted by the pushing of the push button unit,
      a second gear rotatably engaged with the first gear when the first gear is shifted, and
      a third gear connected with the second gear through a driving belt, engaged with a rack gear, and linearly moving the plastic color-coated plate when the second gear is rotated, the rack gear being attached to the plastic color-coated plate and converting rotary motion into linear motion of the gear unit;
   a locking unit regulating rotation of the gear unit according to the pushing of the push button unit;
   a plastic color-coated plate drawn into or out of a body of the sun visor according to the rotation of the gear unit so as to block the light from the sun or the headlights; and
   a restoring spring drawing the plastic color-coated plate into the body of the sun visor when the engagement of the gears of the gear unit is released by the operation of the push button unit and the locking unit.

2. The sun visor according to claim 1, wherein the locking unit includes:
   a first locking key moving along with the first gear when the on button of push button unit is pushed;
   a second locking key fastened with the first locking key when the first locking key moves;
   an unlocking key releasing the fastened state of the first and second locking keys when the off button of push button unit is pushed; and
   an elastic spring returning the first locking key to its original position when the fastened state of the first and second locking keys is released.

3. The sun visor according to claim 1, wherein the locking unit includes:
   a first locking key moving along with the first gear when the on button of push button unit is pushed;
   a second locking key fastened with the first locking key when the first locking key moves;
   an unlocking key releasing the fastened state of the first and second locking keys when the off button of push button unit is pushed; and
   an elastic spring returning the first locking key to its original position when the fastened state of the first and second locking keys is released.

4. A motor vehicle comprising the sun visor of claim 1.

* * * * *